Dec. 10, 1968  JEAN-PAUL JACCARD ET AL  3,414,994
APPARATUS FOR FITTING A TAUT SCREEN TO A FRAME
Filed Oct. 21, 1965  2 Sheets-Sheet 1
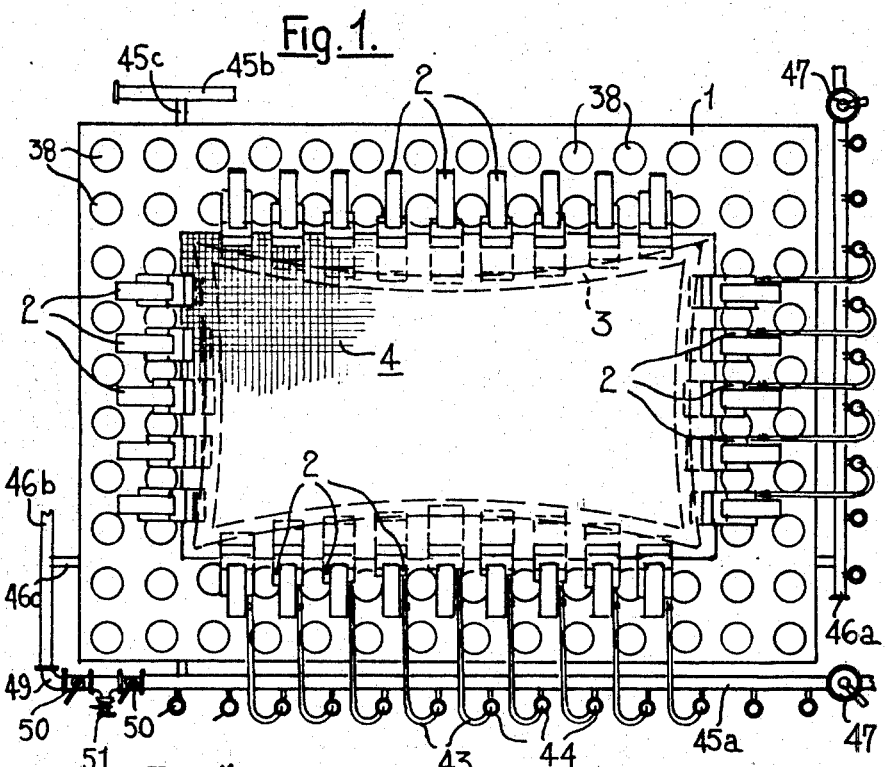
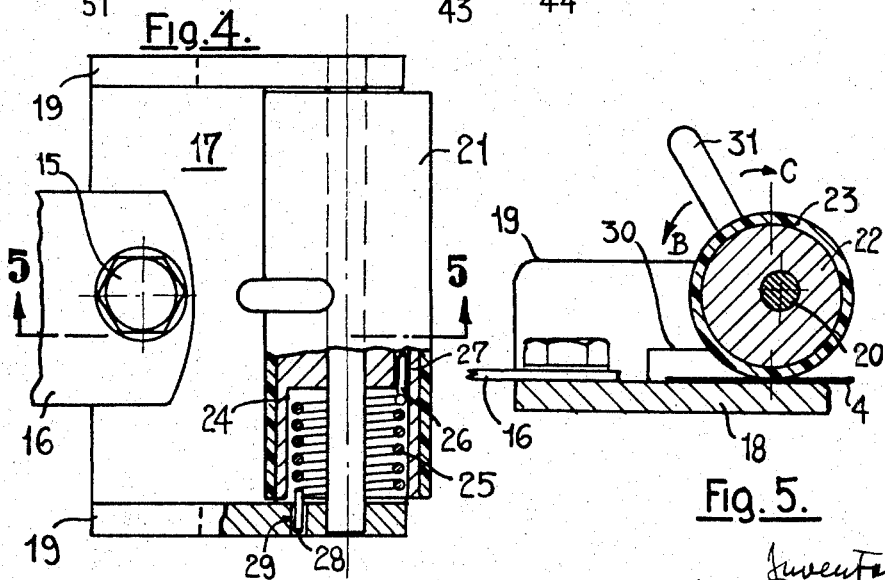

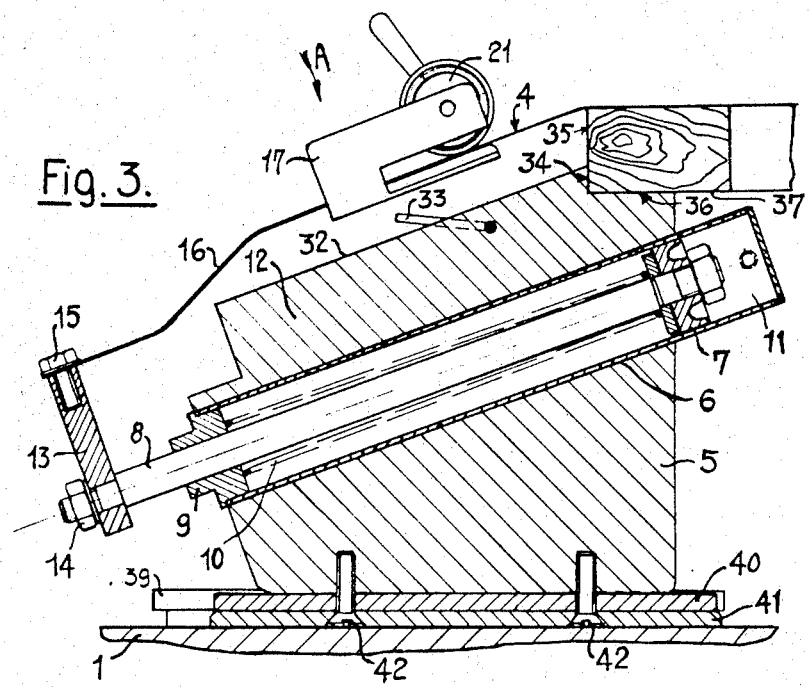
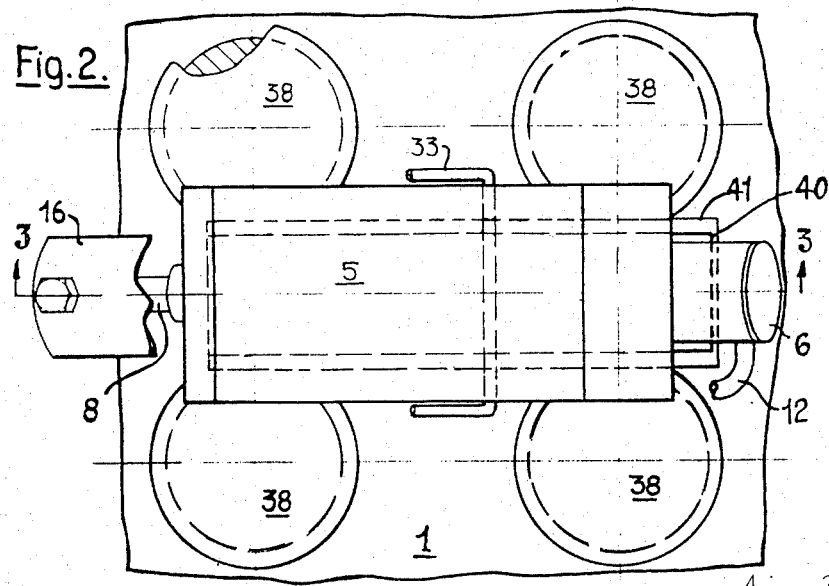

United States Patent Office 3,414,994
Patented Dec. 10, 1968

3,414,994
APPARATUS FOR FITTING A TAUT SCREEN TO A FRAME
Jean-Paul Jaccard, 16 Rue de Savoie, Vevey, Switzerland, and Nicolas Engler, 17 Tiglio, 6900 Cassarate, Switzerland
Filed Oct. 21, 1965, Ser. No. 499,369
Claims priority, application Switzerland, Jan. 25, 1965, 1,003/65
8 Claims. (Cl. 38—102.91)

ABSTRACT OF THE DISCLOSURE

An apparatus for fitting a taut screen to a frame comprising a removable frame, and pressure-medium-operated means mounted for stretching a screen prior to attachment to the removable frame and for subjecting simultaneously the frame to pressures proportioned to the forces exerted on the screen and distributed to the frame substantially in the same manner as the force distribution on the screen.

The present invention relates to apparatus for preparing frames covered with screens, in general, and to apparatus for preparing frames covered with screens for silk-screen printing, in particular. This method of printing uses printing frames with a screen of nylon, silk or other material stretched very taut and as uniformly as possible.

Apparatus used at present for preparing these covered frames has a series of pneumatic or hydraulic jacks allowing the screen to be stressed before it is attached to the frame. Since the frame would collapse on release of the jacks and the screen would therefore become slack, the frame is also stressed first by means of screw or toggle stretches which are removed when the screen is attached. This preliminary deformation required for the frame varies according to the quality and tension of the screen and the resiliency of the frame. Moreover, the stretchers, which are limited in number, do not allow stressing to be distributed in the same way as the tension exerted by the screen. Lastly, the release of the jacks and the disengagement of the stretchers are not simultaneous, and accordingly equilibrium is never obtained between the stresses on the screen and frame without additional deformation.

The known apparatus does not provide uniform tension of the screen, and the prestressing of the frame and the removal of the stretchers are delicate operations which complicate the preparation of the frames and increase costs.

It is an object of the present invention to provide an apparatus for preparing frames covered with screens which makes it easier to cover the frames and allows greater and more uniform tension of the screen.

It is another object of the present invention to provide an apparatus for preparing frames covered with screens, having pressure-medium-operated jacks distributed around the edge of the screen for stretching the screen before it is attached to the frame, and having, for preliminary deformation of the frame, pressure-medium-operated jacks for subjecting the frame to pressure proportional to the forces exerted on the screen and distributed in the same way as the forces on the screen.

With these and other objects in view which will become apparent in the following detailed description, the present invention will be clearly understood in connection with the accompanying drawings, in which:

FIG. 1 is a plan view of the apparatus;

FIG. 2 is an enlarged plan view of a jack of the apparatus;

FIG. 3 is a section along the lines 3—3 of FIG. 2;

FIG. 4 is an enlarged fragmentary view in the direction of arrow A of FIG. 3, partially broken away; and FIG. 5 is a section along the lines 5—5 of FIG. 4.

Referring now to the drawings, and more particularly to FIG. 1, the apparatus shown in accordance with the present invention is for preparing covered frames for silk screen printing and has a table 1 on which there are jacks 2 distributed over the four sides of a frame 3 which is to be fitted with a taut fabric or screen 4. Each jack 2 has a base 5 (FIGS. 2 and 3) resting on the table 1 and having a longitudinal bore with a cylinder 6, in which slides a piston 7 at one end of a piston rod 8 sliding in a guide member 9. A compression spring 10 tends to push the piston 7 to the right (FIG. 3).

A chamber 11 at the right-hand end of the cylinder 6 behind the piston 7 can be supplied with compressed air by means of a feed duct 12 (FIG. 3).

The piston rod 8 carries a bracket 13 held by a nut 14. The rear end of a spring strip 16 is attached to the top of the bracket 13 by means of a screw 15 and its front end carries a clamp 17.

The clamp 17 has a base plate 18 (FIG. 5) with two lateral flanges 19 along the sides (FIG. 4). A shaft 20 is arranged between the two flanges and carries an eccentric 21 having a cylindrical metal body 22 covered with a rubber sleeve 23. At one end of the body 22 there is a cylindrical cavity 24 housing a torsion spring 25. The spring has at one end a lug 26 engaging in a hole 27 in the body 22 and at the other end a lug 28 engaging in a hole 29 in the adjacent flange 19. The spring 25 is biased when mounted and tends to turn the eccentric 21 in the direction of the arrow B in FIG. 5.

The flanges 19 of the clamp 17 have openings 30 (FIG. 5) so that the clamp can be engaged on the edge of the screen 4 after the eccentric has been raised by moving a lever 31 in the direction of the arrow C in FIGURE 5.

The base 5 of the pack 2 (FIG. 3) has an inclined top face 32 adapted to support the clamp 17 and a yoke 33 which can be lowered to allow lateral guiding of it. At the front end of the top face 32 the base 5 has a stepped portion with a vertical face 34 for supporting the outside 35 of the frame and a horizontal face 36 for supporting the lateral underside 37 of the frame (FIG. 2).

Because the cylinder 6 is inclined, the traction exerted on the screen 4 holds the screen against the lateral top surface of the frame and so holds the frame against the shoulder 36 of the base.

The table 1 has a network of mutually perpendicular transverse and longitudinal guides arranged at right-angles to each other, constituted by the spaces between circular heads 38 arranged in a regular formation (FIG. 2). Each guide head 38 has an overhanging upper portion or top 39, and the base 5 of each jack has a rectangular bed plate 40 (FIGS. 2 and 3) engaging between the tops 39 and a second, wider bed plate 41 whose edges engage below the tops 39. Screws 42 fix the bed plates to the jack base. Thus each jack can slide freely along its guide and yet is held onto the table.

The frame 3, basically rectangular, is placed as shown in FIG. 1 on the rows of jacks along its sides, and the sides of the screen 4 are gripped by the clamps 17 of the jacks.

Each jack feed duct 12 is connected by a hose 43 to a compressed-air feed line. Three-way cocks 44 allow the jacks to be connected, isolated or released, according to the position of the cock. The jacks on the two long sides of the frame are joined to two longitudinal lines 45a, 45b (shown in part) interconnected by a tube 45c. The jacks on the short sides of the frame are joined to two transverse lines 46a, 46b (shown in part) linked by a tube 46c. Compressed air is fed to the longitudinal lines from a source (not shown) by means of an adjustable pressure regulator 47, also having a closed position and a release position. The lateral lines are supplied by an adjustable pressure regulator 48 identical to the regulator 47. The longitudinal and transverse lines may be made to communicate by a bypass 49 with isolating valves 50 and a release valve 51.

In order to stretch the screen 4, compressed air is fed to the jacks. Air entering the chamber 11 in a jack pushes the piston and the jack clamp 17 toward the left (FIG. 3). while the jack base 5, being free to move on the table, exerts by reaction an equivalent pressure on the frame 3. The opposite rows of jacks are fed simultaneously, resulting simultaneously in regular stretching of the screen 4 and in compression of the frame with pressures proportional to the traction exerted on the screen. The pressures are distributed along the frame in the same way as the traction is distributed along the edge of the screen.

The presence of the three-way cocks 44 allows a jack to be isolated and, if necessary, relaxed momentarily if the screen has to be gripped again in its clamp.

When the operation has been carried out in both directions, the frame is thereby provided with preliminary deformation corresponding to that which will be imparted to it by the tension of the screen once the screen has been stuck to the frame and the jacks have been released. When the screen has been stuck on, the jacks are released gradually by letting air escape through the release valve 51 so that the pressure exerted by them on the frame falls gradually as the pressure exerted by the screen 4 increases. Thus the release of the jacks does not cause any non-equilibrium or overloading of either the screen or the frame. Since the screen and frame are stressed simultaneously and both the magnitude and the distribution of the stresses are always equivalent, the stretching of the screen is uniform and the screen can be made more taut without the risk of breaking.

The jacks, being free to move, exert practically no stress on the table 1. This table may be of wood or any other light material. It may be divided into a number of panels which have any number of removable jacks and may or may not be used according to the size of frame.

In another embodiment (not shown), the jacks may have two pistons at opposite ends of a common cylinder or in different cylinders, one bearing the means for stretching the screen and the other means for compressing the frame.

Lastly, apparatus such as levers or cams for amplifying force or travel may be inserted between the pistons and the stretching or compressing means.

While we have disclosed several embodiments of the present invention, it is to be understood that these embodiments are given by example only and not in a limiting sense, the scope of the present invention being determined by the objects and the claims.

We claim:
1. An apparatus for fitting a taut screen to a frame comprising:
a removable frame, and
pressure-medium-operated means mounted for stretching a screen prior to attachment to said removable frame and for subjecting simultaneously said frame to pressures proportional to the forces exerted on the screen and distributed to said frame substantially as the force distribution on the screen.
2. The apparatus, as set forth in claim 1, wherein:
said pressure-medium-operated means comprises,
a plurality of jacks mounted around the periphery of said frame and each including:
a cylinder portion,
a piston slidably disposed within said cylinder portion,
said cylinder portion and said piston constituting pressure transmitting elements,
pulling means operatively connected to one of said pressure transmitting elements, for pulling the screen, and
pushing means operatively connected to the other of said pressure transmitting elements for compressing said frame.
3. The apparatus, as set forth in claim 2, further comprising:
a table upon which said plurality of jacks is mounted,
a plurality of guide means mounted on said table and each for guiding movable therealong relative to said table each of said plurality of jacks, respectively,
a plurality of bases each for carrying each of said plurality of jacks, respectively,
said each of said plurality of bases carrying said cylinder portion, and
said pushing means including a support for said frame operatively connected to said other of said pressure transmitting elements.
4. The apparatus, as set forth in claim 3, wherein:
each of said plurality of guide means includes spaced guide heads defining a guide path therebetween for said jacks, and
said guide paths of said plurality of guide means arranged in two mutually perpendicular positions.
5. The apparatus, as set forth in claim 3 wherein:
each of said plurality of guide means includes guide heads defining a guide path therebetween for said jacks,
said guide heads including overhanging upper portions, and
a plurality of bed plates each connected to said each of said plurality of bases, respectively, and movably disposed between said overhanging upper portions of said guide heads for guiding each of said plurality of jacks along said each of said guide means, respectively.
6. The apparatus, as set forth in claim 3, wherein:
said support comprises a shoulder on each of said plurality of bases for receiving a lateral face of said frame,
said other of said pressure transmitting elements being said cylinder portion, and
said pulling means comprises a clamp operatively connected to and movable by said piston and arranged to pull the screen in an inclined direction for pulling the screen onto said frame and pulling said frame onto said shoulder.
7. The apparatus, as set forth in claim 6, further comprising:
a piston rod joined to said piston,
a member rigidly connected to said piston rod transversely of said piston rod,
a spring strip joined at one end to said member, and
said clamp being mounted at the other end to said spring strip.
8. The apparatus, as set forth in claim 5 wherein:
said guide heads are circular.

References Cited
UNITED STATES PATENTS

| 591,421 | 10/1897 | Palmer et al. | 38—102.91 |
| 2,756,217 | 8/1956 | Peterson | 38—102.5 X |

FOREIGN PATENTS

| 594,990 | 9/1925 | France. | |

PATRICK D. LAWSON, *Primary Examiner.*